Figure 1:
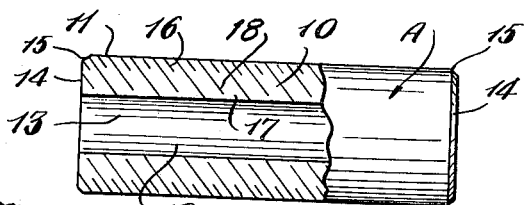

Jan. 10, 1956    H. B. OSBORN, JR    2,730,472
METHOD OF MANUFACTURING HOLLOW TUBULAR ARTICLES
Filed May 7, 1952    2 Sheets-Sheet 1

PARTIAL CUT OFF

DEEP INDUCTION HARDEN

DRAW 950°F

INVENTOR.
HARRY B. OSBORN JR.
BY
*Alfred C. Body*
ATTORNEYS

Jan. 10, 1956  H. B. OSBORN, JR  2,730,472
METHOD OF MANUFACTURING HOLLOW TUBULAR ARTICLES
Filed May 7, 1952  2 Sheets-Sheet 2

INVENTOR.
HARRY B. OSBORN Jr.
BY
Alfred C. Body
ATTORNEYS

United States Patent Office 2,730,472
Patented Jan. 10, 1956

2,730,472

METHOD OF MANUFACTURING HOLLOW TUBULAR ARTICLES

Harry B. Osborn, Jr., Cleveland, Ohio, assignor to The Ohio Crankshaft Company, Cleveland, Ohio, a corporation of Ohio Application May 7, 1952, Serial No. 286,654

9 Claims. (Cl. 148—10.5)

This invention pertains to the art of manufacturing hollow tubular articles and, more particularly, to a method of making hollow tubular articles having externally hardened wearing surfaces.

The invention is particularly adaptable to the manufacture of piston pins and will be described with particular reference thereto, although it will be appreciated that the invention has wider applications.

Piston pins are extensively used to provide a pivoted thrust-transmitting connection between the piston and the connecting rod of reciprocating-type, internal-combustion engines. Their requirements are: high strength to withstand the high forces developed on the inside of an internal-combustion engine; light weight so as to have a minimum of inertia to the high accelerations existing in internal-combustion engines; and a wear-resistant external surface to resist wear while in use. They are usually hollow cylindrical steel sleeves having their outer surfaces hardened by heat treating.

One of the difficulties confronting the manufacturer of such pins is that the hardened external surface is relatively brittle and contributes little to the over-all strength of the pin. Accordingly, the depth of the hardened layer is held to the minimum obtainable with the heat-treating process used. Another difficulty is distortion of the pin due to the heat-treating operations.

Piston pins are usually made by machining them from solid steel bar stock. The bar is drilled axially to provide a tube and cut off at the desired length. In one known method, low-carbon steel bar stock is used which, after the machining operations, is carburized on the external surface and then quenched. A very thin surface-hardened layer results, but the piston pin so made is relatively weak structurally compared to pins of the same size made from medium-carbon steels, because the low-carbon steel core does not possess the strength of the higher-carbon steels.

To overcome this difficulty, another method of manufacture used is to machine the hollow pins from a fully annealed, medium-carbon, hot-rolled steel bar. The pin is then shallow surface hardened using high-frequency induction heating. However, with a hollow tube, accurate control of the depth of hardening is difficult and obtaining of the desired shallow depth of hardness is even more difficult.

This is particularly so where electrical power for the induction heating in the range of 30,000 cycles per second or less is the only power available or economically feasible. As higher frequency power sources generally are unavailable in the power sizes necessary for the operation, or are undependable, some means of obtaining the shallower depth of hardness is necessary with the lower frequencies. The frequency range mentioned is generally the upper limit available from rotating motor-generator equipment which is available in much higher power outputs than electronic power-generating equipment and is much more rugged physically and more dependable.

Another method to machine the hollow pin from a medium-carbon, hot-rolled, steel bar; heat treat the pin to provide a sorbitic microstructure through the entire wall thickness and, then, high-frequency induction surface harden the pin to as shallow a depth as possible. This process provides a relatively strong pin for a given wall thickness; but, again, because of the tubular construction during the final surface-hardening operation, it has been found extremely difficult to obtain the desired shallow depth of hardened case using electrical power having a frequency of 30,000 cycles per second or less.

The present invention contemplates a method of making piston pins which is cheaper than methods heretofore known, is easier to carry out in normal manufacturing methods, produces a piston pin of more uniform quality than heretofore thought possible, enables improved control over the final characteristics of the pin, and permits the obtaining of an outer induction surface-hardened layer of minimum thickness using power having a frequency under 30,000 cycles per second.

In accordance with the present invention, hollow, high-strength articles of manufacture, such as piston pins, are manufactured by taking a solid bar of relatively annealed, quench-hardenable steel; heat treating a deep surface layer (and leaving an unheated core) on the bar equal to or just slightly less than the final desired wall thickness of the article to a tough resilient microstructure, such as sorbite; heat treating a thin surface layer of the bar to provide a hard wear-resistant microstructure, such as martensite, and machining out the unheat-treated core of the bar. In some instances, in accordance with the present invention, the bar, if of a length longer than the desired finished article, may be cut to length after the heat-treating operation or, as a preferred alternative, the bar may be partially severed prior to any heat-treating operation to a depth greater than the desired final wall thickness so that the final machining out of the unheat-treated core will effect the cut off.

It is a principal object of the invention to provide a new and improved method of manufacturing hollow tubular articles, such as piston pins, which avoids all the difficulties of the prior art and which enables the cheap production of strong articles having a hardened external surface of minimum thickness.

Another object of the invention is the provision of a new and improved method of manufacturing hollow tubular articles of maximum strength and minimum weight which comprises providing a solid, annealed, medium-carbon, steel bar; deep surface hardening the bar to a depth approximating the final desired wall thickness of the pin; drawing the hardened layer to provide a sorbitic microstructure; shallow surface hardening the surface of the steel bar and, then, machining out the internal, un-hardened core of the steel bar to provide a hollow tubular article having a wall structure of generally sorbitic microstructure with an external, shallow surface-hardened layer of martensitic microstructure or its equivalent.

Another object of the invention is the provision of a new and improved method of manufacturing piston pins which comprises providing a solid, annealed, medium-carbon, steel bar; partially severing the steel bar at selected points along its length to depths greater than the desired final wall thickness of the pin; drawing the bar to provide a sorbitic microstructure having high strength and ductility; shallow surface hardening the bar to provide an external thin layer of martensite and then drilling out the unheat-treated internal core of the bar and simultaneously severing the completed pin from the solid bar.

Another object of the invention is the provision of a new and improved method of manufacturing piston pins having a minimum thickness surface hardened, wherein high-frequency electrical power having a frequency of 30,000 cycles per second or less may be employed for the final surface-hardening operations.

The invention may be comprised in certain steps and combination of steps, a preferred embodiment of which will be described in detail in this specification and illustrated in the accompanying drawing which is a part hereof, and wherein:

Figure 1 shows a view partially in section of a piston pin manufactured in accordance with the method of the present invention; and Figures 2 through 7 show somewhat diagrammatically a preferred sequence of steps of the method of the present invention.

Referring now to the drawings wherein the showings are for the purposes of illustration only and not for the purposes of limiting the invention, Figure 1 shows a piston pin A generally in the shape of a sleeve, including a cylindrical wall 10 having an outer surface 11, an inner surface 12 defining a central opening 13 and ends 14 which may be chamfered at the corners as shown generally at 15.

The pin A may be made from any of the various known quench-hardenable steels but, for the purposes of the invention, an SAE 1045 steel is sufficient. Obviously, the dimensions of the pin A may be as desired, depending upon the type of service and the size engine in which the pin will be employed; but, for the purposes of this specification, the pins will be assumed to have a length of three inches, an external diameter of one inch and a wall thickness of one fourth of an inch, leaving a one-half inch diameter central opening.

The wall 10 is of a solid unitary construction, but the microstructure thereof is such as to have a plurality of layers of different microstructures to impart to the pin the desired physical characteristics, which layers, although shown as distinct, blend generally from one to the other. Thus, the pin A, as shown by the variations in the cross hatching, has an outer surface layer 16 having a martensitic microstructure, an inner surface layer 17 having a pearlitic microstructure and an intermediate layer 18 having a sorbitic microstructure, each of these terms being generally known to those skilled in the metallurgical art. In the pin shown, the martensitic layer 16 may have a thickness of .080 to .100 inch, while the pearlitic layer 17 has a thickness which is held as thin as possible. Actually, the purpose of the pearlitic layer is to provide a clearance between the tool for drilling the opening 11 and the sorbitic layer 18 which, as it is known, is generally much harder and more difficult to machine than is the pearlitic microstructures. This pearlitic layer 17 could desirably be eliminated.

The martensitic layer 16 has a hardness in the range of 60 Rockwell C and provides an external hard, wear-resistant surface on the piston pin A, thus enabling the pin to withstand any abrasion or rubbing forces while in use. Actually, it is relatively weak structurally compared to the sorbitic microstructure layer 18 which provides the principal strength for the pin. Preferably, the sorbite layer has a hardness in the range of 300 Brinell. Sorbite has the characteristic of being relatively tough and ductile and is much stronger physically than pearlitic microstructure normally found in annealed, medium-carbon steels. Sorbite is, however, generally too hard for economical drilling or other machining operations.

The piston pin shown in Figure 1 is produced by the following combinations of steps:

1. Providing an elongated bar of quench-hardenable, fully annealed or near fully annealed steel;
2. Partially severing the bar at points corresponding to the desired length of the piston pin A;
3. Deep induction surface hardening the bar to a depth equal to or just slightly less than the desired final wall thickness of the pin A while leaving an unheat-treated core;
4. Drawing this induction-hardened layer to provide a sorbitic microstructure having a hardness of 300 Brinell;
5. Shallow induction surface hardening the bar to provide a shallow hardened layer having a martensitic microstructure;
6. Drawing the externally hardened surface at a temperature to relieve any stresses resulting from the shallow surface-hardening operation; and
7. Drilling out the unheat-treated core of the bar, which operation removes the unsevered portion of the bar stock.

Figure 2:
Figure 2:
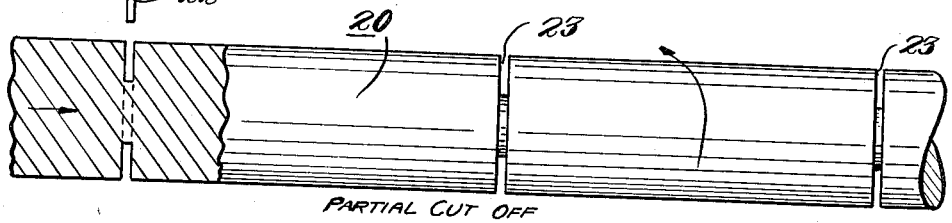

The partial cut-off operation is shown in Figure 2. Here, a bar 20 of SAE 1045 steel is mounted in a lathe or other type of machine tool (not shown). A cut-off tool 21 having a cut-off lip 22 mounted on a carriage of the machine tool is advanced into the bar at predetermined points along its length to cut a narrow slot 23. This operation is repeated at predetermined points along the bar, spaced to equal the length of the desired final piston pin. The depth of cut of the cut-off tool 21 is preferably just in excess of the desired final wall thickness of the pin A which, in the embodiment shown, would mean just greater than one-fourth of an inch. To provide this depth of cut-off, the length of the cutting lip is made just slightly greater than the desired wall thickness and the cutting lip blends into the body of the tool 21 by short radius 23 so that the partial cut-off tool can also cut the chamfer or corner 15 of the piston pin A.

Hot-rolled or fully annealed, carbon-steel bars normally have a very thin surface layer of decarburized material, resulting from the oxidation of the carbon in the steel when the steel bar is at elevated temperatures during its manufacture. If this decarburized layer exists, it should be preferably machined or ground away in the same machine in which the partial cut-off operation is performed or in separate machines, or the bar should have been previously submitted to a recarburizing operation. Any steps taken to effect the alteration of this outer decarburized layer form no part of the present invention.

Figure 3:
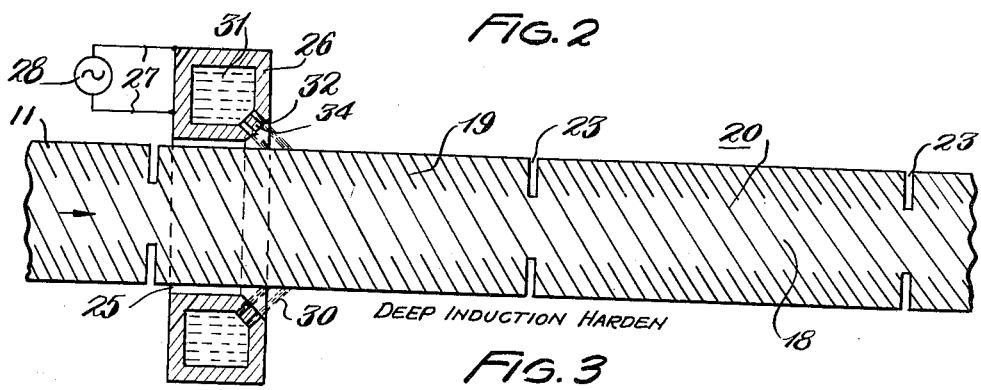

The deep induction surface-hardening step is shown in Figure 3, the layer hardened being indicated by the numeral 19 and the unheated core by the numeral 18. In this step, the bar 20 supported by means not shown but well known in the heat-treating art is progressively moved at a uniform rate through the bore 25 of a high-frequency inductor 26 supported with the axis of the bore coaxial with the axis of the bar 20. This inductor is connected by means of bus bars or other electrical leads 27 to a source of high-frequency power shown diagrammatically at 28. High-frequency currents flowing in the inductor 26 generate or induce high-frequency currents to flow in the surface of the bar 20, which currents in the bar 20 rapidly heat the surface to elevated temperatures. The frequency of electric power, the dimensions of the inductor 26 and the speed of movement of the bar 20 relative to the inductor are all so relatively controlled and adjusted that the surface of the bar heats to a temperature equal to the critical temperature for the steel employed to a depth equal to or just slightly less than the desired final wall thickness. For SAE 1045 steel, this temperature is in the neighborhood of 1500° F.

Immediately after the bar 20 leaves the bore of the inductor 26, a quenching medium 30, such as water, projected under pressure from the interior 31 of the inductor 26 through openings 32 in an angular wall of the inductor, immediately and rapidly cools the heated surface at a rate sufficiently rapidly to transform all of the metal of the bar heated to the critical temperature to a martensitic microstructure. The core 18 is unaffected by this heat treatment of the surface. The steps and apparatus necessary to effect this hardening operation are all known to those skilled in the induction-heating art.

With the solid bar 20 shown, it is possible to maintain extremely accurate control of the depth of the hardened layer 19 over the entire length of the bar and over many different lengths of bars. The width of the slot 23 is generally held quite narrow and does not particularly affect the depth of the hardness pattern obtained. However, in some instances, the depth of hardening may tend to increase slightly at the slots 23. This may be prevented by a momentary reduction in the power to the inductor 26, either by momentarily cutting the power off altogether or partially reducing it.

The depth of the hardened layer 19 obtained will vary depending upon a number of factors, all of which may be obtained by experiment, calculations, or both, all of which are known to those skilled in the induction-heating art. However, for the purposes of illustration, a one-turn inductor as shown having a bore length of one inch and supplied with approximately 30 kw. of 3,000-cycle electrical power will produce a one-quarter inch hardened layer on a one-inch steel bar when the bar is progressed through the inductor at a rate of one-half inch per second.

The axial length of the bore is that of the surface of the bore parallel to the outer surface 11 up to but not including the surface 34 through which the quench water is projected onto the surface of the bar. If 10,000-cycle high-frequency power is employed, then the axial length of the bore should be approximately one-half inches, everything else remaining the same.

Figure 4:
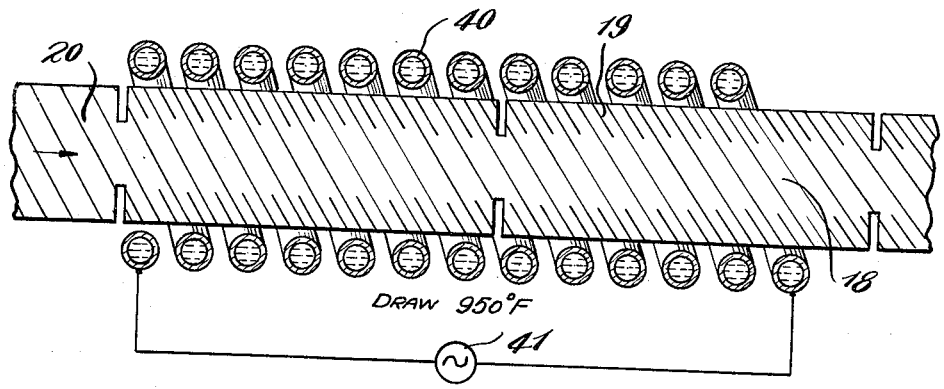

The step of drawing the deep induction surface-hardened layer 19 is illustrated diagrammatically in Figure 4. In this step of the method, the bar 20, heat treated as illustrated in Figure 3 and supported by supports (not shown), is progressively moved through a multiturn high-frequency induction coil 40 energized from a suitable source of high-frequency energy 41. In this step, high-frequency currents flowing in the coil 40 heat the surface of the bar at a much slower rate so that the bar is heated entirely all the way through to a temperature of approximately 950° F. This heating to the stated temperature changes the microstructure of the previously induction-hardened layer 19 from that of a martensitic microstructure to what has become known in the art as a sorbitic microstructure. This microstructure, as previously stated, is generally tough and ductile as distinguished from the martensitic microstructures which is generally hard and brittle. The core 18 which was unaffected in the previous deep induction-hardening operation is unaffected by this drawing operation and generally retains its pearlitic microstructure. The stated temperature will produce a hardness in this layer of about 300 Brinell. If other hardnesses are desired, other temperatures may be employed.

It is desirable in this step that the outer hardened layer 19 be heated uniformly throughout its radial thickness to the desired drawing temperature. Normally, this requires that the bar be heated all the way through to the desired final temperature. When high-frequency induced currents are employed to produce this heat, normally the currents flow only in the outer surface of the deep induction-hardened layer and the heat generated thereby must flow into the center of the bar 20 by conduction. To prevent overheating and overdrawing of the outer surface of the layer 19, low power concentrations should be employed and in order to get sufficient amount of heat with this low-power concentration, the heat at the low-power concentration must be applied over longer axial lengths of the bar 20. Thus, in Figure 4, the multiturn coil 40 is preferably comprised of a plurality of turns of hollow copper tubing through which cooling water is circulated through suitable plumbing connections not shown and has a substantial axial length. This length and the power input to the coil are so adjusted that the total heat induced into the bar 20 will produce the desired final draw temperature. For the one-inch bar stated, 50 kilowatts of 3,000-cycle power through a coil having a length of 10 inches may be employed when the bar is progressed through the coil at a rate of one-half inch per second.

It will be noted that this speed is the same as that specified for the deep induction-hardening step shown in Figure 3. Therefore, it is quite possible and preferred that the deep induction-hardening and drawing operation all take place in one continuous sequential operation. Alternatively, it is possible to interrupt the quench of Figure 3 leaving some residual heat in the bar which will require less power input to the inductor 40.

Figure 5:
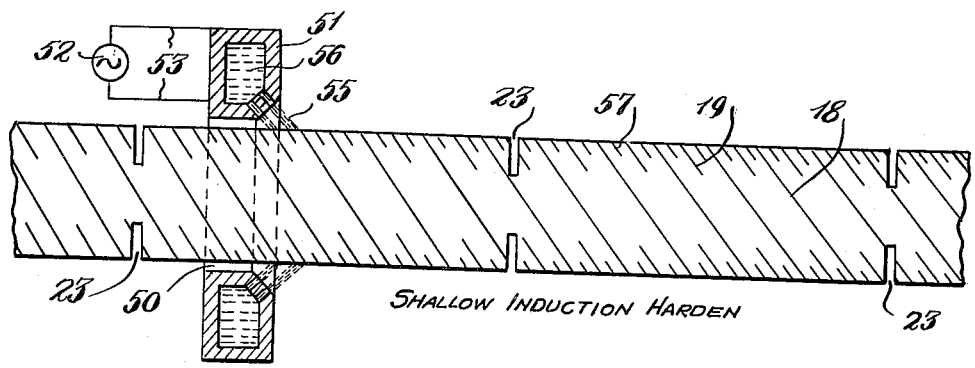

The shallow surface-hardening step is shown in Figure 5. In this step, the bar 20 supported as previously referred to is progressed through the workpiece-receiving bore 50 of a high-frequency inductor 51 connected to a source of high-frequency power 52 by means of bus bars or leads 53. As the bar 20 passes through the bore 50 of the inductor 51, an outer surface layer 57 (indicated by the short cross hatch lines) is rapidly heated by high-frequency currents induced to flow by similar high-frequency currents flowing in the inductor 51 to a temperature above the critical temperature of 1500 degrees for SAE 1045 steel. Immediately after the surface layer 57 reaches this critical temperature, quench water 55 flowing from the interior 56 of the inductor 51 under high pressure rapidly cools the layer at a rate sufficient to produce a martensitic microstructure.

It will be noted that the inductor 51 is quite similar in construction to the inductor 26 of Figure 3 with the excepion that the axial length of the workpiece-receiving bore 50 is substantially less than the length of the workpiece receiving bore 25 of the inductor 26. Additionally, a greater amount of power is employed; but, because of the shorter axial length of the bore and because the quench is effected so soon after the heating operation, the heat does not have time to be conducted inwardly into the bar and only the thin surface layer 18 is heated to the critical temperature of 1,500° F. Thus, the layer 57 is very thin. For the size of the piston pin stated, it is preferred that this thickness be held to .080 to .100 inch. This depth of hardness may be obtained by progressing the bar 20 through the inductor 51 at a rate of one-half inch per second while using 50 kilowatts of 10,000-cycle power to the inductor. In this instance, the axial length of the workpiece-receiving bore is approximately one-half inch.

Because the bar is solid during this shallow surface-hardening operation, it is possible to obtain a much shallower surface-hardened layer using electrical power of 10,000 cycles per second than would otherwise be obtainable if, for example, the bar were hollow as is the finished piston pin. As previously pointed out, this outer layer has a martensitic microstructure which, as is known to those skilled in the metallurgical art, has a high hardness but relatively little strength because of its brittle characteristics. Therefore, it is desirable and many times essential that this surface-hardened layer be maintained as thin as possible but, of course, thick enough to provide the wear-resistant characteristics so necessary with the severe usage to which piston pins are subject.

It is possible to obtain the thin surface-hardened layer of 57 using either 10,000-cycle electrical power, which is normally produced by a rotating motor-generator unit or by using 450 kc. electrical power which is normally produced by high vacuum tube electronic power sources, the latter tending to produce a shallower hardened depth than the former. The present invention permits the use of the 10,000-cycle motor-generator unit, which is considered much more desirable because of its rugged physical and dependable operating characteristics for the surface-hardening operation. Furthermore, its initial cost on a per-kilowatt basis is much less than that of the electronic 450 kc. power source. Another factor involved is that electronic power sources having power outputs on the order of 50 kilowatts or higher which would be required to effect the heat-treating operation are not generally available. Also, this size is close to or above the generally considered practicable limit for electronic power sources. However, a 50 kilowatt, 10,000-cycle motor generator is relatively small compared to larger commercially available units.

The 450 kc. power source would enable the obtaining of the required shallow depth of the hardened layer 57 even though the bar were in the form of a tube at the time of hardening. However, obtaining the required shallow depths of hardened layer using 10,000-cycle power on a hollow tube would be a rather difficult matter which is entirely overcome by effecting the hardened layer 57 with the bar in solid form.

A further distinction which may be pointed out at this time as to the difference of performing the hardening operations on a hollow tube as against a solid bar is that when the hardening operations are performed in the solid bar, there is far less tendency for distortion to result. Holding the distortion to a minimum is very desirable because all such distortion must be eliminated by machining or grinding operations following the heat-treating operations and the less metal which must be removed in these operations, the better.

Figure 6:
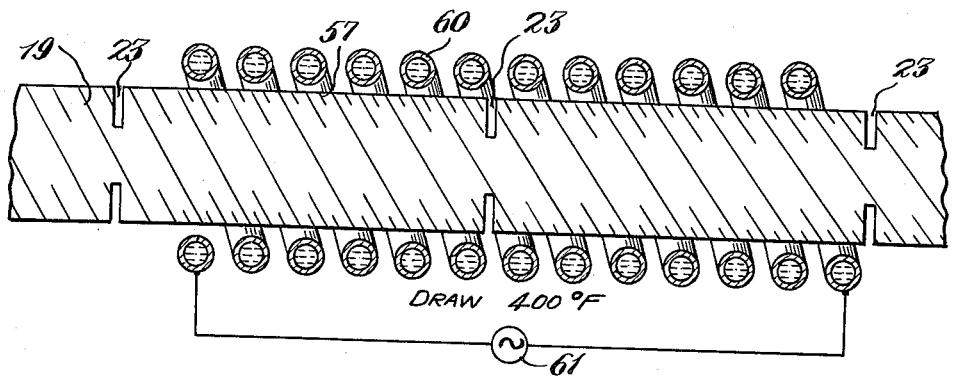

Immediately following the shallow surface-hardening step, the bar 20 is reheated to a temperature of approximately 400 degrees to provide a drawing action on the externally surface-hardened layer to relieve any hardening stresses therein. Thus, as shown in Figure 6, the bar 20 is progressively advanced through a multiturn, high-frequency, induction-heating coil 60 preferably made of hollow copper tubing connected to a high-frequency power source 61. The coil 60 is similar in construction to the coil 40 shown and described with reference to the showing of Figure 4 and will not be further described herein. Its construction is familiar to those skilled in the induction-heating art. In this drawing operation, a relatively low power concentration is employed. A power input of 20 kilowatts at 10,000 cycles to a 5-inch long multiturn inductor is sufficient to heat the outer layer to the desired drawing temperature when the bar 20 is progressed through the coil 60 at a rate of one-half inch per second.

It will be noted that in all of the above-described steps, the bar 20 is progressed through the induction-heating coils at a rate of one-half inch per second so that it is possible to place the various induction-heating coils in axially aligned relationship and the various steps referred to may be effected in sequence while the bars 20 are advanced continuously at a uniform rate through the various inductors. Obviously, the steps may either be performed at different speeds, either all alike or different, if desired.

Figure 7:
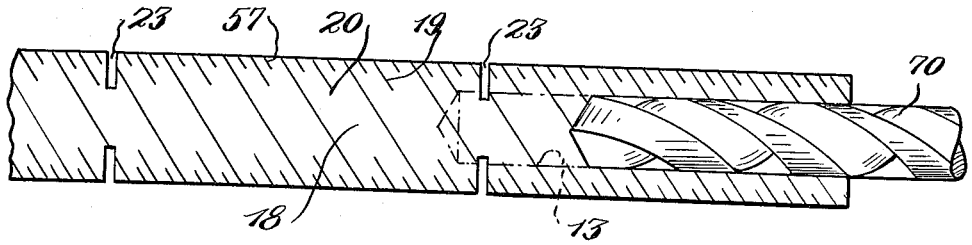

Following the shallow surface-hardening operation and drawing operation, the bar 20 is supported in suitable machine tools and the internal, unhardened core is drilled or otherwise machined out as shown diagrammatically in Figure 7. In this figure, a drill 70 is rotated relative to the bar 20 and fed coaxially down the length of the bar to drill out the internal unheat-treated core 18. This drill has a dimension equal to the desired internal diameter of the opening 11 and has a diameter slightly greater than the diameter of the bar opposite the partially severed portions so that when the drill comes opposite to the cut 23, the piston pin will be severed from the remainder of the bar. At this point, the drill 70 is retracted and the piston pin removed. The pin is ready for any final machining operation such as grinding the external diameter of the pin to the desired final dimension. This drilling operation is continuously repeated and each time the drill 70 comes opposite the cut 23, another piston pin drops off free from the bar 20.

As previously stated, the deep induction-hardening step shown in Figure 3 followed by the drawing shown in Figure 4 is capable of producing a sorbitic microstructure layer 19 having a very accurately controllable depth while, at the same time, leaving the center or core 18 unaffected by the heat-treating operation. Thus, the core 18 has a pearlitic microstructure, if the bar 20 were originally in the fully annealed condition, so that it is very easily and economically machined out with a maximum tool life. It is possible to control the depth of the hardened layer 19 so that the unheat-treated core 18 is just slightly greater than the diameter of the drill 70 so that at no time during the drilling operation must the drill machine the heat-treated metal. This, of course, leaves a thin layer 17 of pearlitic microstructure material forming the interior surface 13 of the piston pin A.

High-frequency induction heating has been described for all of the various heat-treating operations. It will be appreciated that gas or other forms of heating could be employed but high-frequency induction heating is preferred because it is possible to more accurately control the depth of heating in the deep induction-hardening step shown in Figure 3 and to more readily obtain the shallow depth of hardness shown in Figure 5.

The invention has been described with reference to the manufacture of piston pins, although it is not necessarily so limited. The invention is particularly applicable to piston pins and has been described with reference thereto for the purposes of giving a better understanding to those reading this specification. The invention is obviously equally applicable to any other article of manufacture which must have a very shallow surface-hardened layer of minimum depth. As pointed out above, it would be impossible to obtain the shallow depths of hardness stated using 3,000 and 10,000-cycle high-frequency power if the hardening operation were to be effected upon hollow cylindrical articles.

The preferred embodiment of the invention has been described to include the partial cut off of the piston pin prior to the heat-treating operation. This is a very desirable step but, in some instances, may be eliminated and the entire cut-off operation effected after all of the heat-treating operations have been performed. Also, the drawing operation shown in Figure 6 may, if desired, be eliminated if an extremely hardened layer of maximum hardness, irregardless of the internal stresses, is desired, or may be effected by a shortened quench and the residual heat left by the shortened quench.

Obviously, modifications and variations of the preferred embodiment will occur to others upon a reading and understanding of this specification. It is my intention to include all such modifications and variations, insofar as they come within the scope of the appended claims.

Having thus described my invention, I claim:

1. The method of manufacturing hollow, steel piston pins having a predetermined wall thickness and length which comprises providing a solid, hot-rolled bar of medium-carbon steel; partially severing the bar at lengths according to the desired length of the piston pin and to depths in excess of the desired final wall thickness of the piston pin; heating the surface of said bar to temperatures above the critical and to depths generally equaling that of the desired wall thickness of the final piston pin; rapidly quenching said surface to provide a hardened outer layer having a thickness equal to said final wall thickness; drawing said bar to produce a sorbitic structure, shallow, induction hardening the surface of said bar by rapid induction heating followed by a quench; drawing said surface to a temperature sufficient to relieve any stresses in the shallow-hardened surface without substantially changing its microstructure; and drilling out the unheat-treated core of said bar.

2. The method of manufacturing a hollow, steel, high-strength article of a predetermined wall thickness and predetermined length comprising providing a solid, hot-rolled, medium-carbon steel bar, rapidly heating a surface layer of said bar to a temperature above the critical temperature of the steel and to a depth generally equal to the desired final wall thickness of the tubular article and rapidly quenching same, drawing said quench-hardened surface to produce a sorbitic structure in said layer and leaving a soft unheat-treated core and, subsequently, drilling the soft, unheat-treated core from said solid bar.

3. The method of manufacturing hollow, steel articles having a predetermined wall thickness comprising, providing a solid, annealed bar of a quench-hardenable steel, heating a surface layer of said bar to a depth generally equal to the desired final wall thickness of the tubular article to a temperature at least in excess of the critical temperature followed by a rapid and vigorous quench to produce a martensitic structure having a depth generally equal to the desired final wall thickness of the pin and, subsequently, drilling out the soft, unheat-treated core of said bar.

4. The method of manufacturing hollow, tubular articles having a predetermined wall thickness which comprises providing a solid, annealed bar of a quench-hardenable steel, heating and quenching a surface layer of said bar to a depth equal to the desired final wall thickness of the article to a temperature at least in excess of the critical temperature for the steel employed to provide a martensitic layer of a thickness generally equal to the final desired wall thickness of the article, reheating said bar to a temperature to change the characteristics of said hardened martensitic layer to sorbitic characteristics, subsequently drilling out the soft, unheat-treated portions of said bar.

5. The method of manufacturing hollow piston pins of a predetermined wall thickness which comprises providing a solid bar of annealed, medium-carbon steel having a diameter at least equal to the desired diameter of the pin, deep induction hardening the surface of said bar to a depth equal to that of the thickness of the final pin, drawing said hardened surface at a temperature to produce a tough, sorbitic microstructure, shallow induction hardening the surface of said bar to produce a thin hardened layer on said bar and then drilling the soft, unheat-treated portion from said bar to produce a hollow heat-treated piston pin.

6. The method of manufacturing hollow piston pins of a predetermined length and wall thickness which comprises providing a solid bar of annealed medium-carbon steel having a diameter of at least equal to the desired diameter of the pin, partially severing said bar at spaced points equal to the desired length of said pin and to a depth at least equal to said wall thickness, heat treating the surface of said bar to produce a sorbitic microstructure to a depth substantially equal to said wall thickness and leaving an unheated core, heat treating the surface of said bar to produce a thin surface layer of martensitic microstructure and drilling the unheat-treated core of said bar to produce hollow, heat-treated piston pins.

7. The method of manufacturing a hollow, cylindrically shaped article of manufacture from quench-hardenable steel having an externally hardened surface layer of a depth shallower than that which is possible to obtain using less than 30,000-cycle high-frequency induced heat on the hollow steel article which comprises providing a solid steel member of quench-hardenable steel having an outer diameter approximately equal to the desired diameter of the hollow steel article, surrounding said member with a high-frequency inductor, energizing said inductor from a power source having a frequency below 30,000 cycles per second and heating a very thin surface layer on said member to the critical temperature, thereafter immediately quenching the surface and then drilling an opening axially through said member to provide a hollow cylindrical steel article.

8. The method of claim 7 wherein the article prior to surrounding it with a high-frequency inductor is notched to a depth at least greater than the depth of the thin surface layer to be subsequently hardened on the article.

9. The method of claim 8 wherein the depth of the notch is greater than the ultimate wall thickness of the steel article.

References Cited in the file of this patent

UNITED STATES PATENTS

| | | |
|---|---|---|
| 1,472,922 | Lothrop | Nov. 6, 1923 |
| 1,720,353 | Schneider | July 9, 1929 |
| 1,909,553 | Schermer et al. | May 16, 1933 |